Figure 1:
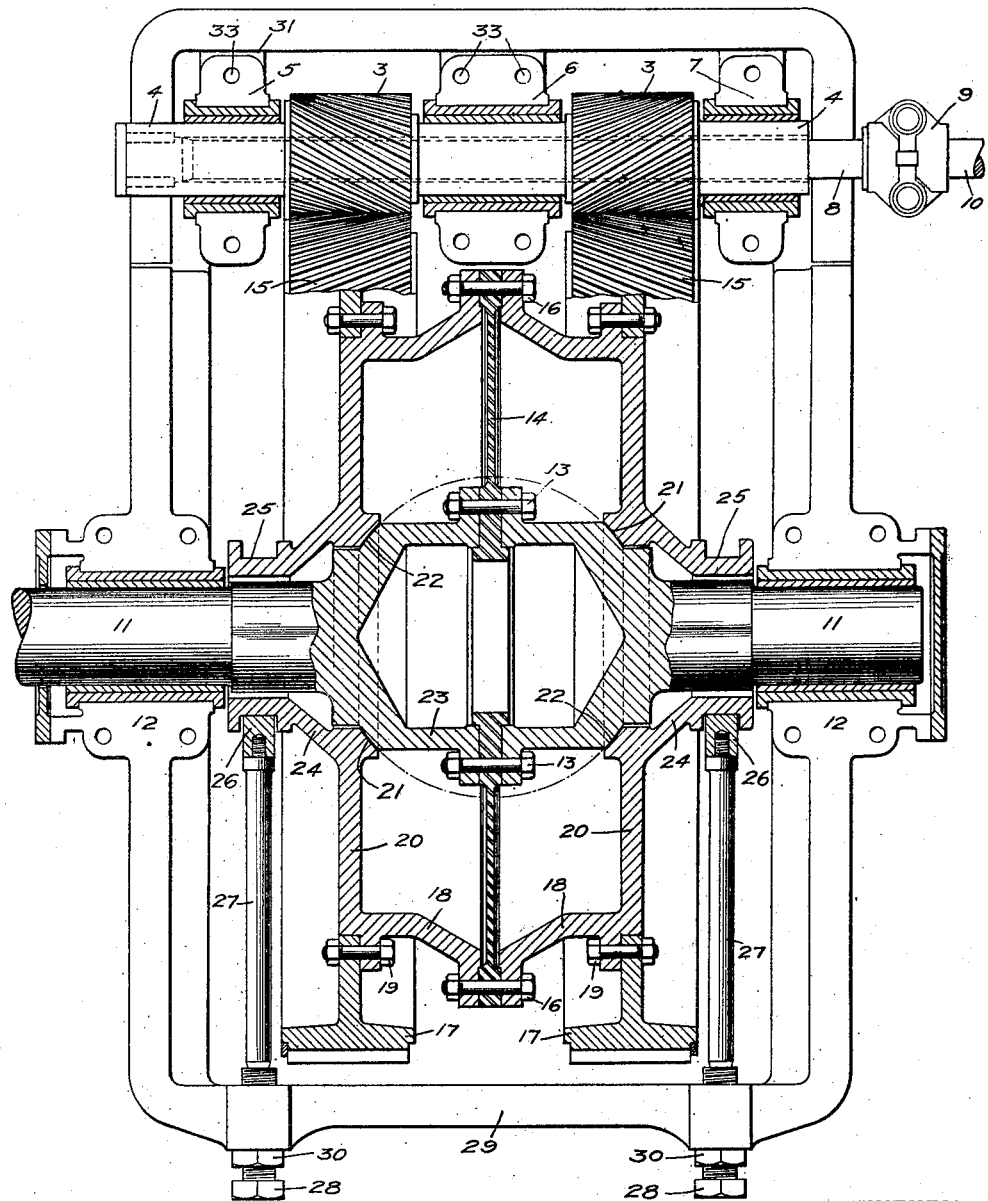

G. WESTINGHOUSE.
REDUCTION GEARING.
APPLICATION FILED FEB. 11, 1910.

1,031,758.

Patented July 9, 1912.

2 SHEETS—SHEET 1.

G. WESTINGHOUSE.
REDUCTION GEARING.
APPLICATION FILED FEB. 11, 1910.

1,031,758.

Patented July 9, 1912.
2 SHEETS—SHEET 2.

WITNESSES

INVENTOR.

BY

HIS ATTORNEY IN FACT.

UNITED STATES PATENT OFFICE.

GEORGE WESTINGHOUSE, OF PITTSBURGH, PENNSYLVANIA.

REDUCTION-GEARING.

1,031,758.   Specification of Letters Patent.   Patented July 9, 1912.

Application filed February 11, 1910. Serial No. 543,372.

*To all whom it may concern:*

Be it known that I, GEORGE WESTINGHOUSE, a citizen of the United States, and a resident of Pittsburgh, in the county of Allegheny and State of Pennsylvania, have made a new and useful Invention in Reduction-Gearing, of which the following is a specification.

This invention relates to reduction gearing and has for an object the production of gearing for transmitting power from turbines or other high speed motors to apparatus to be run at lower speeds.

A further object of this invention is to produce a reduction gearing in which the distribution of pressure on the teeth of the gears in transmitting power is automatically adjusted and equalized.

These and other objects which will readily appear to those skilled in this art, I attain in the device described in the specification and illustrated in the drawings accompanying the same and throughout which like elements are denoted by like characters.

Figure 2:
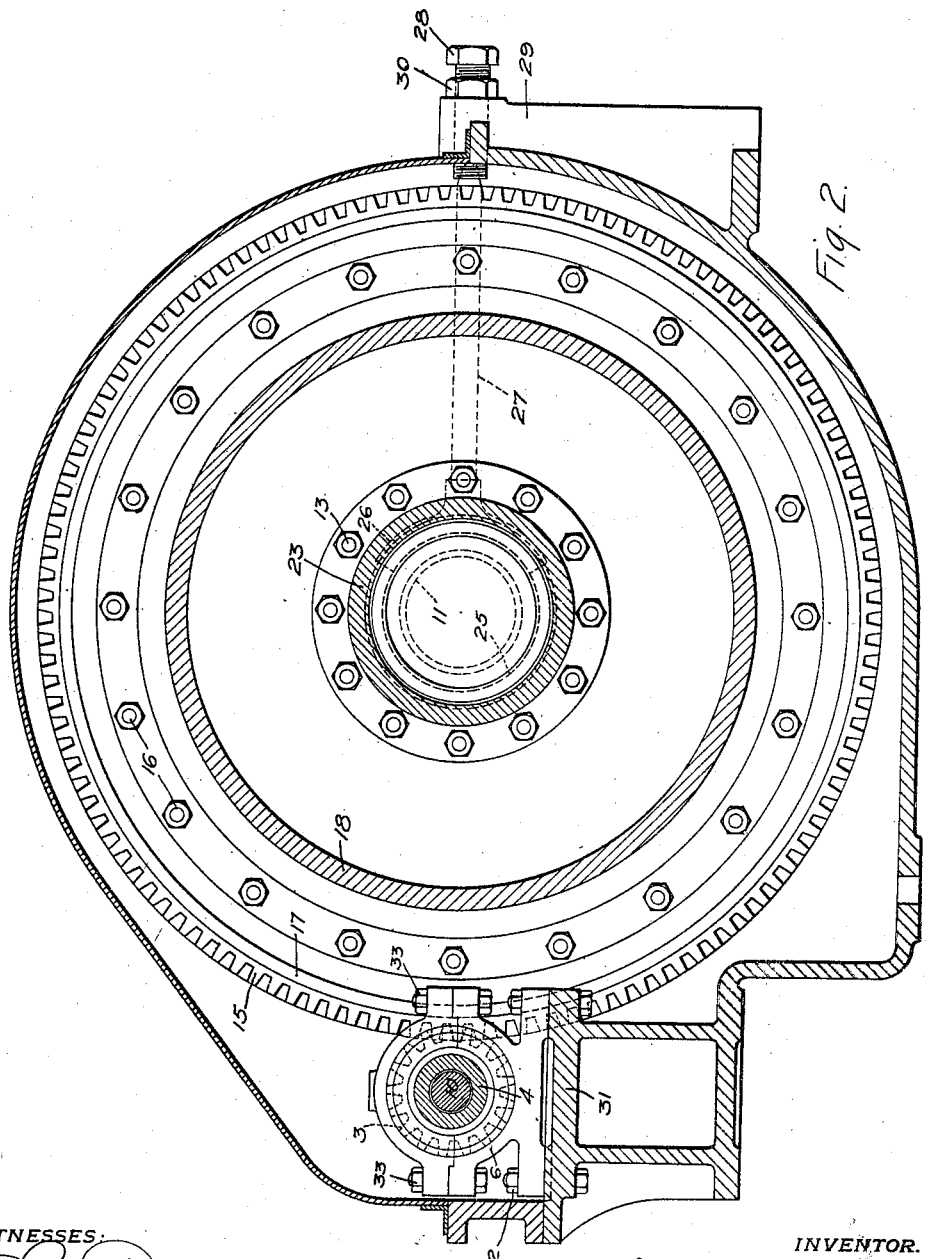

In the drawings, Figure 1 is a view partially in plan and partially in section of a device embodying this invention and Fig. 2 is a sectional elevation of such device.

The device consists of a pair of pinions 3 formed integral with or mounted rigidly upon a spindle or shaft 4 journaled in three alined bearings 5, 6, and 7. If desired, the spindle 4 may be made hollow and a shaft 8 projecting within the hollow spindle 4 may be secured thereto by means of a web or diaphragm connection as is now common. The shaft 8 with its connection to the spindle 4, which will preferably be adjacent bearing 5, accomplishes the same purpose as though the spindle 4 were materially lengthened, and this shaft 8 by means of a flexible coupling 9 of any desired construction is adapted to be connected to shaft 10 which may be the shaft of a turbine or any other relatively high speed motor, the speed of which it is desired to reduce.

A shaft 11 which is adapted to be connected by any suitable means to the thing, such as a propeller shaft or other device which it is desired to drive from the high speed motor at a reduced speed, is journaled in bearings 12. Shaft 11 is preferably formed hollow and in two parts bolted together by means of bolts 13. Between the two portions of the shaft a steel plate or diaphragm 14 is secured and to this plate the two gear wheels 15 of the wheel portion of the reducing gear are secured by means of bolts 16.

The gear wheels which together form a rigid gear element or member are made up of sections 17—17 on which the teeth are cut and sections 18—18 which are secured to diaphragm 14 by means of bolts 16, and to which sections 18—18, sections 17—17 are secured by means of bolts 19. The gear wheel thus formed is supported on shaft 11 by means of supporting webs 20—20, preferably formed integral with sections 18—18. Each web 20 is machined at 21 so as to form an annular concave surface which with an annular convex surface 22 formed on an enlarged central portion 23 of shaft 11 forms a ball and socket joint between the gear wheel and its shaft 11. Diaphragm 14 serves as the driving agent between the gear wheel and its shaft and of course to some extent helps to support the gear wheel on the shaft. Each web 20 is provided with a sleeve portion 24 which surrounds the shaft 11 and is provided with a bearing surface 25. A yoke member 26 bears against bearing surface 25 and is carried by a strut 27, the outer end of which is formed pointed and rests within a socket formed in the end of an adjusting screw 28.

Adjusting screw 28 is threaded through an opening therefor in the main frame 29 of the device and is locked in adjusted position by means of a lock nut 30. The longitudinal axis of each strut 27 lies within the plane including the axes of the gear and pinion and stands at right angles to the axis of the pinion. Bearings 12 for shaft 11 are carried in the main frame of the device, and the bearings 5, 6 and 7 for the pinion member are preferably carried in three bearing boxes each bolted to a bed 31 by means of bolts 32. Each bearing box is provided with a cover portion secured to it by means of bolts 33.

In the device illustrated the gears are provided with spiral teeth but it will be understood that straight teeth may if desired be utilized but with somewhat less efficiency. With spiral teeth arranged as illustrated, when the pinion and gear members are in action the longitudinal position of the pinion member is determined by the action of the spiral teeth; that is, the pinion which is capable of longitudinal movement within its bearings will be moved to and held in just the proper position by the teeth. The flexible coupling between the motor shaft 10 and the pinion member, which in reality includes shaft 8 and the flexible coupling, 9, must be formed so that it can only exert a rotary torque on the pinion member and no force axially when the device is in perfect adjustment.

In making large gears such as will of necessity be used in reducing the speed between a relatively high speed turbine and a slow speed propeller shaft it is practically impossible to cut the gear teeth so accurately and to assemble the device so perfectly that if rigidly mounted gears and pinions were used the pressure distribution on the teeth under load would be uniform. If the tooth pressure is not uniform or evenly distributed the gears will not only unduly wear but will be liable to tear themselves to pieces.

By utilizing the flexible diaphragm 14 and the ball and socket joint for mounting the wheel member so that it has freedom of movement relative to the shaft which carries it I provide a reducing gearing in which the tooth pressures are automatically adjusted and evenly distributed. It will be seen that if the alinement of the gear member and the pinion member is not correct the flexible diaphragm and the ball and socket joint will allow the gear member to accommodate itself to this' misalinement. The ball and socket joint will also permit the gear member to freely move independent of its mounting shaft to take care of any irregularities in the teeth of either the gear member or the pinion member so that the tooth pressures will be automatically adjusted.

While the gears of the gear member and pinion member are shown separated, it will be apparent that they may be placed close together if desired; of course leaving room for the flexible diaphragm and its mountings. The diaphragm if desired may be utilized in the pinion member rather than in the gear member and the shaft 11 carrying the gear member may be formed as a through shaft and the diaphragm formed with an opening surrounding the same. In fact many departures from the exact construction illustrated may be made without departing from the spirit of this invention so long as one or the other of the members is mounted so that it has freedom of movement with respect to its mounting shaft in a plane perpendicular to the plane passing through the axes of the two members. The flexible diaphragm 14, if it is desired, may be made up of a number of separate plates coextensive in extent with diaphragm 14 or of varying sizes similar to the leaves of a spring, or if desired, the diaphragm may be corrugated. The struts 27 limit the freedom of movement of the gear member to a plane including the axis of the gear member and perpendicular to the plane including the axes of the gear and pinion members when the device is at rest. This is necessary as otherwise the device would be unstable.

In accordance with the provisions of the patent statutes I have described the principle of operation of my invention together with the apparatus which I now consider to represent the best embodiment thereof, but I desire to have it understood that the apparatus shown is only illustrative and that the invention can be carried out by other means.

What I claim is:

1. In reduction gearing, intermeshing gears, a shaft for one of said gears and a flexible driving member between said gear and said shaft constructed so as to allow relative angular motion between the gear axes.

2. In reduction gearing, intermeshing gears, a shaft for one of said gears and a diaphragm connection between said gear and said shaft whereby relative angular motion therebetween is permitted.

3. In reduction gearing, intermeshing gears, a shaft for one of said gears, a ball and socket joint between said shaft and said gear for allowing relative angular motion therebetween in all directions and a driving connection between said shaft and its gear.

4. In reduction gearing, intermeshing gears, a shaft for one of said gears, a ball and socket joint between said shaft and said gear, the center of which is located in the axis of said gear and a diaphragm driving connection between said shaft and said gear.

5. In reduction gearing, intermeshing gears, a shaft for one of said gears, a ball and socket joint between said shaft and said gear, the center of which is located in the axis of said gear, and a driving connection between said shaft and said gear constructed so as to allow relative angular motion between said shaft and said gear in all directions.

6. In reduction gearing, intermeshing gears, a shaft for one of said gears, a driving connection between said gear and said shaft constructed so as to allow relative angular motion therebetween, and means for limiting said motion to a plane including the axis of said shaft and perpendicular to the plane including the axes of said gears at rest.

7. In reduction gearing, intermeshing gears, a shaft for one of said gears, a flexible driving member between said gear and said shaft constructed so as to allow relative angular motion therebetween, and means for limiting said motion to a plane including the axis of said shaft and perpendicular to the plane including the axes of said gears when at rest.

8. In reduction gearing, intermeshing gears, a shaft for one of said gears, a diaphragm connection between said gear and said shaft whereby relative angular motion therebetween is permitted, and means for limiting said motion to a plane including the axis of said shaft and perpendicular to the plane including the axes of said gears when at rest.

9. In reduction gearing, intermeshing gears, a shaft for one of said gears, a ball and socket joint between said shaft and said gear for allowing relative angular motion between said shaft and said gear, a driving connection between said shaft and said gear, and means for limiting said angular motion to a plane including the axis of said shaft and perpendicular to the plane including the axes of said gears when at rest.

10. In reduction gearing, intermeshing gears, a shaft for one of said gears, a ball and socket joint between said shaft and said gear, the center of which is located in the axis of said gear, and means for preventing relative angular motion between said shaft and said gear except in a plane including the axis of said shaft and perpendicular to the plane including the axes of said gears when at rest.

11. In reduction gearing, intermeshing gears, a shaft for one of said gears, a ball and socket joint between said shaft and said gear, the center of which is located in the axis of said gear, a driving connection between said shaft and said gear and means for preventing relative angular motion between said shaft and said gear except in a plane including the axis of said shaft and perpendicular to the plane including the axes of said gears when at rest.

12. In reduction gearing, intermeshing gears, a shaft for one of said gears, a driving connection between said gear and said shaft constructed so as to allow relative angular motion therebetween, and adjustable means for limiting said motion to a plane including the axis of said shaft and perpendicular to the plane including the axes of said gears at rest.

13. In reduction gearing, intermeshing gears, a shaft for one of said gears, a flexible driving member between said gear and said shaft constructed so as to allow relative angular motion therebetween, and adjustable means for limiting said motion to a plane including the axis of said shaft and perpendicular to the plane including the axes of said gears when at rest.

14. In reduction gearing, intermeshing gears, a shaft for one of said gears, a diaphragm connection between said gear and said shaft whereby relative angular motion therebetween is permitted, and adjustable means for limiting said motion to a plane including the axis of said shaft and perpendicular to the plane including the axes of said gears when at rest.

15. In reduction gearing, intermeshing gears, a shaft for one of said gears, a ball and socket joint between said shaft and said gear for allowing relative angular motion between said shaft and said gear, a driving connection between said shaft and said gear, and adjustable means for limiting said angular motion to a plane including the axis of said shaft and perpendicular to the plane including the axes of said gears when at rest.

16. In reduction gearing, intermeshing gears, a shaft for one of said gears, a ball and socket joint between said shaft and said gear, the center of which is located in the axis of said gear, a driving connection between said shaft and its gear, and adjustable means for preventing relative angular motion between said shaft and said gear except in a plane including the axis of said shaft and perpendicular to the plane including the axes of said gears when at rest.

17. In reduction gearing, intermeshing gears, a shaft for one of said gears, a ball and socket joint between said shaft and said gear, the center of which is located in the axis of said gear, a driving connection between said shaft and said gear and adjustable means for preventing relative angular motion between said shaft and said gear except in a plane including the axis of said shaft and perpendicular to the plane including the axes of said gears when at rest.

18. In reduction gearing, a shaft carrying a pinion member, a gear member meshing therewith, a shaft for said gear member, a ball and socket joint between said gear member and said shaft, a diaphragm driving connection between said gear member and said shaft and adjustable struts contacting with said gear member for limiting the angular motion between said gear member and its shaft to a plane including the axis of said shaft and perpendicular to a plane including the axis of said shaft and pinion.

19. In reduction gearing, a pinion member, a gear meshing therewith, a shaft for said gear, a connection between said shaft and gear constructed so as to allow relative angular motion between said shaft and gear, due to the tooth pressures encountered during operation, and means for so limiting said motion encountered that said gearing is stable.

In testimony whereof, I have hereunto subscribed my name this 8th day of February, 1910.

GEO. WESTINGHOUSE.

Witnesses:
C. W. McGHEE,
JNO. S. GREEN.